United States Patent [19]

Hamada

[11] Patent Number: 5,576,834
[45] Date of Patent: Nov. 19, 1996

[54] OPTICAL WAVEMETER UTILIZING NUMERICAL FRACTION DIFFERENCE OF PULSES FOR DETERMINING ABSOLUTE WAVE LENGTH

[75] Inventor: Madoka Hamada, Tokyo, Japan

[73] Assignee: Ando Electric Co., Ltd., Tokyo, Japan

[21] Appl. No.: 529,638

[22] Filed: Sep. 18, 1995

[30] Foreign Application Priority Data

Sep. 30, 1994 [JP] Japan ................................ 6-261733

[51] Int. Cl.$^6$ ........................................ G01B 9/02
[52] U.S. Cl. ................................. 356/346; 356/358
[58] Field of Search ............................ 356/345, 346, 356/358

[56] References Cited

U.S. PATENT DOCUMENTS

| 5,133,598 | 7/1992 | Badeau ........................... 356/346 |
| 5,164,788 | 11/1992 | Yoshikawa ....................... 356/346 |
| 5,247,342 | 9/1993 | Tamura et al. .................... 356/345 |
| 5,486,918 | 1/1996 | Nagashima ....................... 356/346 |

Primary Examiner—Samuel A. Turner
Assistant Examiner—Robert Kim
Attorney, Agent, or Firm—Finnegan, Henderson, Farabow, Garrett & Dunner, L.L.P

[57] ABSTRACT

A wavemeter apparatus for a precise determination of a wavelength of a target light beam and its measuring error is presented. The apparatus is an interferometer type apparatus which computes fractional part of the interference fringes. The apparatus includes a beam splitter (1) to divide the target light beam into two beams which are injected into a fixed mirror (2) and a moving mirror (3) and the reflected beams are inputted into a photoreceiver (4) to generate interference fringes. The photoreceiver (4) generates a first pulse signal (21) for every fringe spacing given by $\lambda/2$ and the distance measuring device (5) generates a second pulse signal (22) for each distance d travelled by the moving mirror given by a resolution capability of the distance measuring device (5). A computation section (6) computes count values M and N(M), for the first pulse signals (21) and the second pulse signals (22), respectively. The fractional part of the count $\epsilon M$ is computed by using a relation $M\lambda/2=d(N(M)+\epsilon M)$ and an estimated wavelength $\lambda M$ is computed from a relation $\lambda M=2dN(M)/M$ based on the values of M·N(M). The display section (7) displays the value of $\lambda M$, and the computation section (6) stores the count value N(M) corresponding to each value M of the interference fringes. The final closest estimated value of the target light beam is derived by numerical computation from the count N(M).

2 Claims, 7 Drawing Sheets

OPTICAL WAVEMETER UTILIZING NUMERICAL FRACTION DIFFERENCE OF PULSES FOR DETERMINING ABSOLUTE WAVE LENGTH

BACKGROUND OF THE INVENTION

1. Field of the Invention

The present invention relates in general to wavelengths measuring devices, and relates in particular to an optical wavemeter using an interferometer.

2. Description of the Related Art

Figure 3:
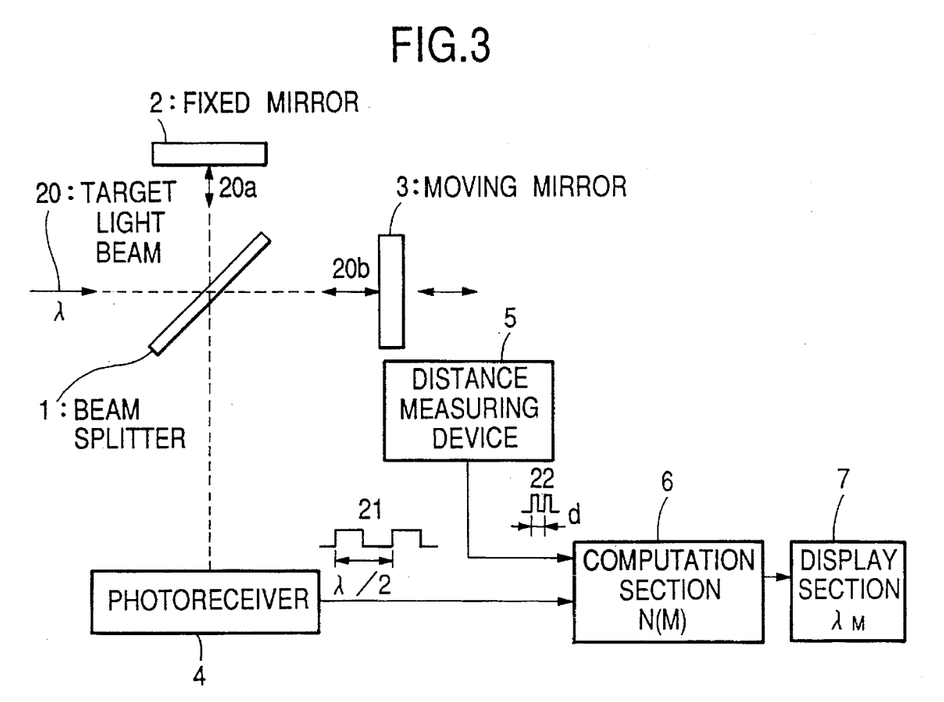
FIG. 3 a schematic block diagram of a conventional optical wavelength measuring apparatus.

An example of the structural configuration of a conventional optical wavemeter is shown in FIG. 3. The wavemeter comprises: a beam splitter 1; a fixed mirror 2; a moving mirror 3; a photoreceiver 4; a distance measuring device 5; a computation section 6; and a display section 7. For the fixed mirror 2 and the moving mirror 3, corner cube prisms, for example, may be utilized which always provides coincidence in the direction of incident/reflection light. Also, the moving mirror 3 is fixed on a linear moving stage (not shown), for example, and the linear moving stage is moved by a motor (not shown) through a belt and pulleys.

Referring to FIG. 3, the beam splitter 1 receives a target light beam 20 having an unknown wavelength X and splits the beam 20 into a reflected beam 20a and a transmitted beam 20b. The reflected beam 20a is reflected back by the fixed mirror 2 and, after passing through the beam splitter 1, is injected into a photoreceiver 4. The transmitted beam 20b is reflected by the moving mirror 3 back to the beam splitter 1, to be injected into the photoreceiver 4. The reflected beam 20a and the transmitted light 20b received by the photoreceiver 4 repeatedly generates periodic interference fringes due to the translation action of the moving mirror 3, and, through the process of photocoversion, the photoreceiver 4 generates electrical signals in accordance with the intensity of the interference fringe. A pulse signal 21 outputted by the photoreceiver 4 is received by the computation section 6 for each interference fringe.

The distance measuring device 5 measures the amount of the movement (shown by a lateral arrow in FIGS. 1, 2 and 3) of the moving mirror 3, and generates a pulse signal 22, for each resolution unit d of the distance measuring device 5, and outputs the pulse signal 22 to the computation section 6. The distance measuring device 5 utilizes known distance determining devices, based on an fringes counting method by injecting a He-Ne laser reference beam together with a target light beam into a common optical path to measure the travel distance with reference to the Intensity of the interference beam, or an opto-electronic device to measure the distance of travel of the moving mirror having a reference scale to read the distance of travel of the scale opto-electronically.

The computation section 6 calculates the estimated wavelength $\lambda m$ of the target light beam (of unknown wavelength) based on the count value of the pulse signal 22 outputted by the distance measuring device 5 when the pulse count of the pulse signals 21 from the photoreceiver 4 has reached a predetermined value.

Figure 4:
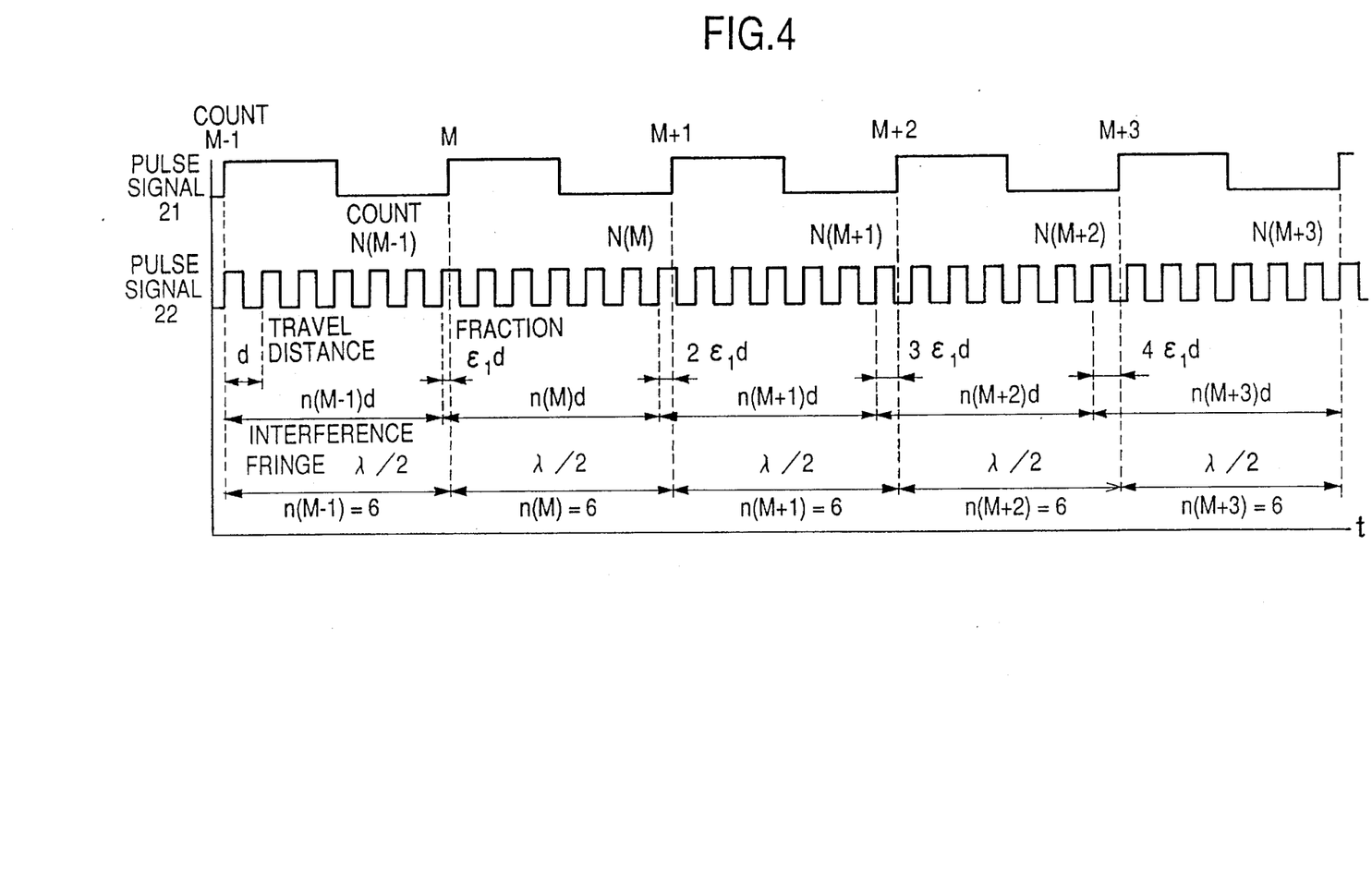
FIG. 4 is a schematic illustration of the pulse signals preceding or following a count value M of the pulse signal 21.

The process of determination is further explained in FIG. 4 which shows the state of the pulses preceding and following a cumulative count M of the pulse signal 21. To facilitate understanding, FIG. 4 shows the rise time of the pulse signal 21 at the count M-1 to be coincident with the rise time of the pulse signal 22; however, it is not mandatory that the rise times be coincidental. Also, the explanations refer to the condition that the estimated wavelength $\lambda M$ of the target light beam is never higher than the true wavelength $\lambda$ of the target light beam (i.e. $0 \leq \epsilon M < 1$), where m is a fractional count of a pulse (shortened to fraction, hereinbelow); however, it is not necessary in practice that this condition be met.

In FIG. 4, it is shown that the magnitude of the fraction $\epsilon M$ increases successively from $\epsilon 1d$, $2\epsilon 1d$ to $3\epsilon 1d$, however, according to the apparatus shown in FIG. 3, the true value of $\epsilon M$ is unknown, because the count M of the pulse signal 21 from the photoreceiver 4 is a pre-determined value, and relates only to the corresponding cumulative count $N(M)$ of the pulse signal 22 from the distance measuring device 5.

Furthermore, a count value $n(M)$ of the pulse signal 22 for one fringe, generated by the distance measuring device 5, is given by $n(M)=N(M)-N(M-1)$ which contains a fractional information, but this quantity is not measured in the conventional apparatus.

The operation of the conventional computation section 6, shown in FIG. 3, will be explained with reference to FIG. 4. The pulse signal 21 is generated for each fringe (in other words, every time the moving mirror 3 moves a spacing of half a wavelength, $\lambda/2$), and the pulse signal 22 is generated for each travel distance d of the moving mirror. The travel distance d is equal to the resolution capability of the distance measuring device 5. Here, if it is assumed that counting is commenced from the rise time of both pulse signals 21 and 22, and letting M be the count value of the pulse signal 21 and N be the corresponding count value of the pulse signal 22, then the following equation holds:

$$M\lambda/2 = d(N(M) + \epsilon M) \quad (1)$$

where $\epsilon M$ is a fraction within a range $0 \leq \epsilon M < 1$. In practice, the circuit count is triggered by the rise event of the pulse signals, therefore, the count value includes the fractional part, and the count value of the pulse signal 22 becomes $N(M)+1$; however, in equation (1), $N(M)$ is obtained by subtracting 1 from the count value $N(M)+1$.

In the optical circuit configuration shown in FIG. 3, the computation section 6 calculates the estimated wavelength $\lambda M$ from the pulse data shown in FIG. 4 using the equation (1) according to the following equation (2):

$$\lambda M = 2dN(M)/M \quad (2)$$

The wavelength error $\Delta$ is also obtained from equation (1) as:

$$\Delta = 2d\epsilon M/M \quad (3)$$

however, because the fraction $\epsilon M$ is an unknown, and in practice, it is rounded-off and specified as:

$$\Delta < 2d/M \quad (4)$$

As explained above, to measure the (true) wavelength $\lambda$ of a target light beam using the conventional wavemeter, the wavelength error is specified under the worst condition given by equation (4) because the fraction $\epsilon M$ is not measured. However, in general, the value of the wavelength $\lambda M$ obtained by computation is often much closer to the value of $\lambda$ than those given by equation (4). Furthermore, using the fringes which precede or follow the pre-determined count value M of the pulse signal 21, it is quite often possible to obtain a value close to the true value of the wavelength $\lambda$. What is lacking in the exiting apparatus and method is an approach to finding an appropriate value for the fractional count M.

SUMMARY OF THE INVENTION

It is an object of the present Invention to provide a wavemeter for recording count values of the fringes selected in a suitable sampling interval and for generating an estimated wavelength value as close as possible to the true wavelength together with a value for error associated with numerical computation process.

The object is achieved in a wavemeter comprising: a beam splitter for dividing the target light beam into a first beam and a second beam; a fixed mirror for receiving the first beam to be reflected back to the beam splitter; a moving mirror for receiving the second beam to be reflected back to the beam splitter; a photoreceiver for converting interference fringe having two $\lambda/2$ spacings, produced by optical interference of the first beam with the second beam in accordance with a travel distance of the moving mirror, and generating a first pulse signal for every $\lambda/2$ spacing; a first distance measuring device having a first resolution capability d, defining a unit of the travel distance of the moving mirror, and generating a second pulse signal for each unit; a computation section for counting first pulse signals produced by the photoreceiver to generate a first cumulative count M, for counting a plurality of the second pulse signal produced by the first distance measuring device to generate a second cumulative count N(M) and for computing a first estimated wavelength $\lambda M$ of the target wavelength $\lambda$ as $\lambda M = 2dN(M)/M$ based on a relation $M\lambda/2 = d(N(M)+\epsilon M)$ where $\epsilon M$ is a numerical fraction of the second pulse signals at M; a display section for displaying a result of the first estimated wavelength $\lambda M$; wherein the wavemeter apparatus is provided with further memory section in the computation section such that: the memory section stores a number of counts n(M) of the second pulse signals in a fringe spacing between M and M-1, for all values of M between 1 and a maximum count MMAX; the computation section computes a value of a first fraction $\epsilon 1$ from a relation, $\epsilon 1 = N(M)/M - n(1)$ where $\epsilon 1$ is a numerical fraction of the second pulse signals in a first fringe spacing; determining a sampling interval KD by using the $\epsilon 1$ and an integer coefficient k which minimizes an absolute value of the numerical fraction; determining a starting count m from an integer section of a value given by a relation $m = (MMAX - KD)/|D|$, where D is a minimum value of the numerical fraction and $|D|$ is an absolute value of D, to compute a second estimated wavelength $\lambda MM$ nearest to the wavelength $\lambda$ so that: when D>0, a maximum wavelength value of $\lambda MM$ is computed by a relation $\lambda MM = 2dN(m)/m$ and a wavelength measurement error $\Delta$ is given by a relation $\Delta = 2dD/m$; and when D<0, a maximum wavelength value of $\lambda MM$ is computed by a relation $\lambda MM = 2dN(m+kD)/(m+kD)$ and a wavelength measurement error $\Delta$ is given by a relation $\Delta = 2dD/(m+kD)$.

According to the wavemeter apparatus presented above, by providing an extra memory space and steps for determining the numerical fraction of a count accurately, a conventional apparatus can be made to produce a significantly more precise measurement of a target wavelength over a conventional wavemeter. By using two distance measuring devices of high and low resolution capabilities, the range of wavelengths for wavelength measurement can be increased significantly. Therefore, the present wavemeter presents a cost effective solution to the heretofore unresolved deficiencies in the conventional wavemeters.

DESCRIPTION OF THE PREFERRED EMBODIMENTS

Figure 1:
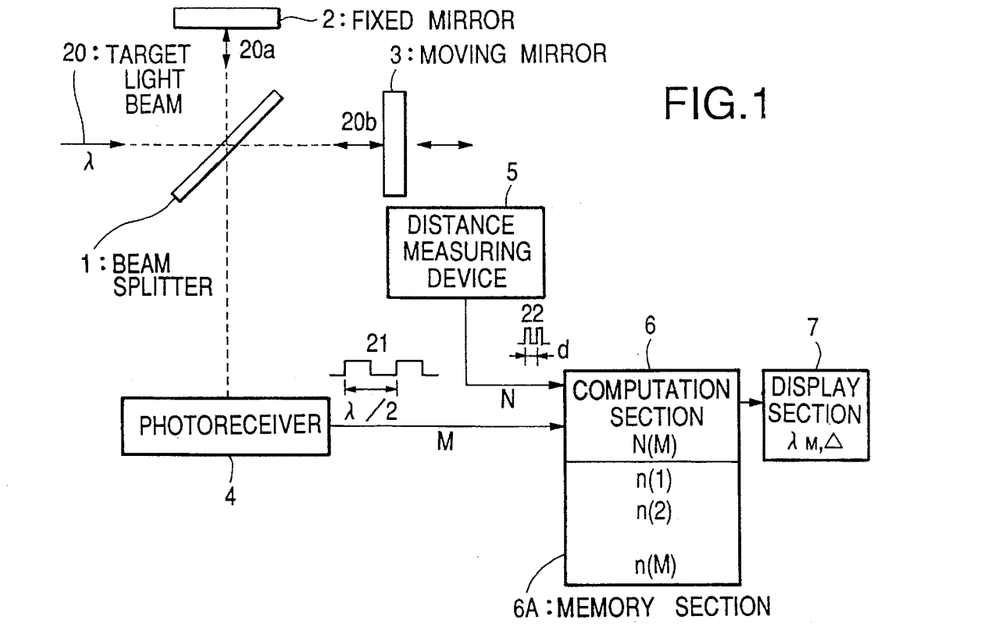
FIG. 1 is a schematic block diagram of a first embodiment of the optical wavelength measuring apparatus of the present Invention.

FIG. 1 shows a schematic block diagram of the structural configuration of a first embodiment of the present invention. The memory section 6A shown in FIG. 1 comprises an addition of further memories to the computation section 6 included in the conventional wavemeter apparatus shown in FIG. 3, and contains information corresponding to the fractions $\epsilon M$. The memory section 6A stores an appropriate count value n(M) of the pulse signal 22 generated within one fringe, which is outputted by the distance measuring device 5. The computation section 6 performs numerical computation operations (to be described later) on the basis of the data stored in the memory section 6A. The computation produces a value of wavelength $\lambda MM$ which represents a value of wavelength nearest to the target wavelength $\lambda$ as well as an estimated measurement error. The display section 7 displays both the wavelength $\lambda MM$ and the estimated measurement error.

The memory capacity of the memory section 6A required can be estimated quite readily by knowing the target wavelength, measurement resolution capability and the maximum travel distance. For example, if the target wavelength $\lambda$ is 1550 nm and the resolution capability d of the distance measuring device 5 is 5 nm, the count value of the pulse signal 22 within one fringe n(M) is approximately 155, therefore, n(M) can be recorded with an 8-bit memory. For an interferometer having the maximum travel distance of 100 mm, the count value of the pulse signal 21 from the photoreceiver 4 is about 130,000 which indicates that the size of the memory needed is about 130×8 kbytes.

Figure 5:
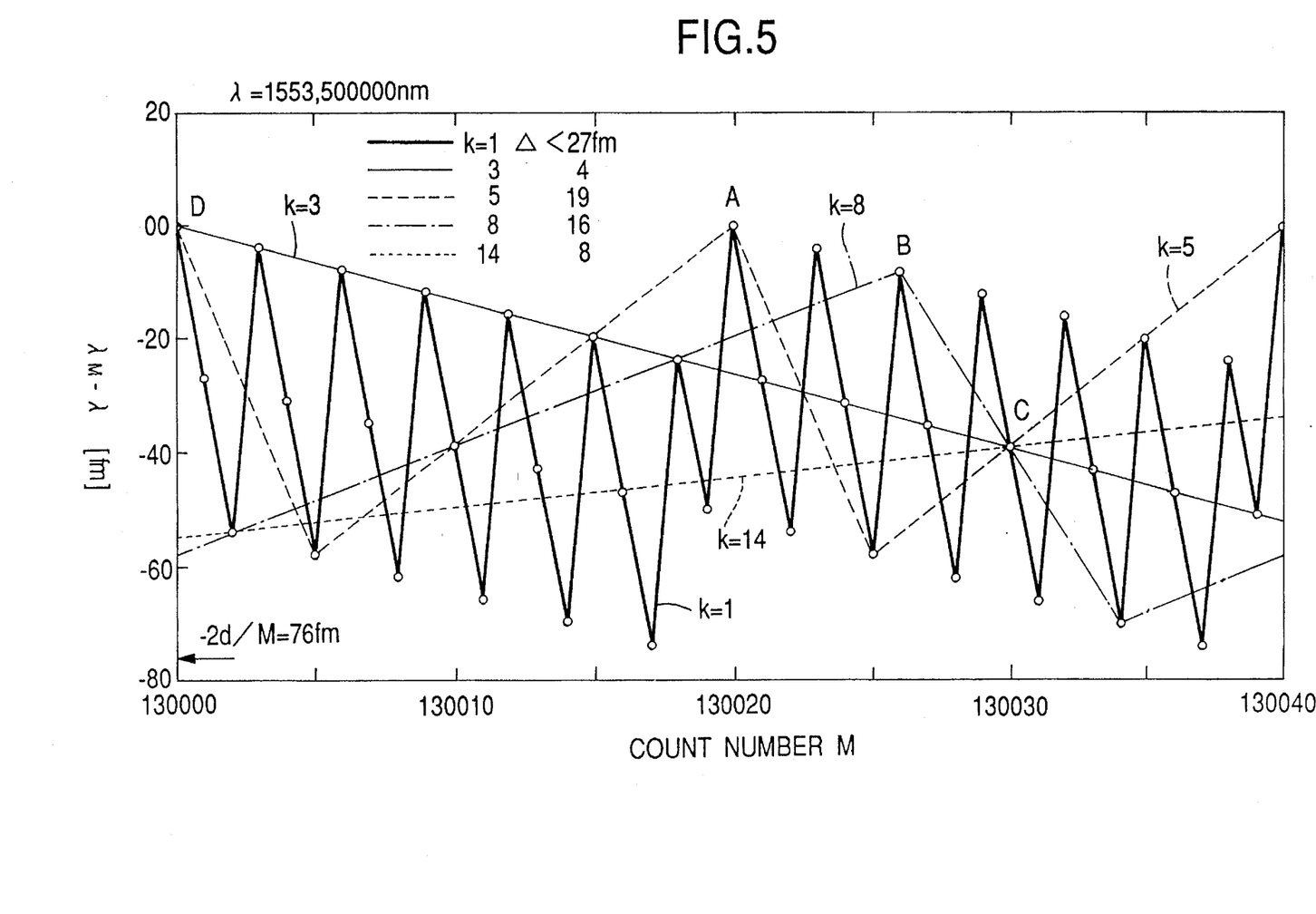
FIG. 5 is a graph showing a periodic changes in the wavelengths measured in relation to the count M of the pulse signal 21.

When the relationship of the pulse signals 21 and the pulse signals 22 is as shown in FIG. 4, FIG. 5 shows how the measured wavelengths exhibit periodic changes, within the range of measuring errors given by equation (3), depending on the count M of the pulse signal 21. This is further explained in detail in the following.

Referring to FIG. 4, designating a count of the pulse signal within a first fringe by n(1), and in the second fringe by n(2), the cumulative count value over a M number of fringes is given by the following equation:

$$N(M)=n(1)+n(2)+\ldots+n(M_{max}) \quad (5)$$

From equation (1), the count for the first fringe is given by:

$$\lambda/2=d(n(1)+\epsilon 1) \quad (6)$$

and the value of fraction $\epsilon 1$ is estimated by the following procedure. Using equation (6) and the estimated wavelength $\lambda M$ from equation (2), the fraction $\epsilon 1$ is given by:

$$\epsilon 1 = N(M)/M - n(1) \quad (7)$$

Therefore, it can be seen that as the number of fringes increases, the value of the fraction $\epsilon M$ is given by a series of increasing values of fractions $\epsilon 1, 2\epsilon 1, 3\epsilon 1, \ldots, M\epsilon 1$. Equation (3) shows that a large value of M and a small value of $\epsilon M$ produce a small measurement error, therefore, the precision of the wavemeter is improved by finding a condition for measurement to yield the smallest fraction in the vicinity of M.

To find a condition to yield the smallest fraction in the vicinity of M, a sampling interval k (k>1) for fringe counting is determined, in terms of a series of sampling intervals to count M, for example, (... M-2k, M-k, M). The value of k can be determined freely with a restriction that k>1.

For example, FIG. 5 shows a method of how to determine the fraction accurately. The process is illustrated with a case of a target wavelength of $\lambda=1553.5$ nm, resolution d=5 nm and the count M for pulse signal 21 is approximately up to 130,000 counts corresponding to a travel distance of 100 mm. As a first estimation, the value of $\epsilon 1$ is calculated from equation (7) to be 0.34999. The decimal fraction of the first fringe for a sampling interval k is $k\epsilon 1$. Then, the numerical fraction $\delta(k)$ is defined to be the absolute values of the difference between $(k\epsilon 1)$ and $(k\epsilon 1)-1$. The following table shows how the numerical fraction $\delta(k)$ varies when the sampling interval k is varied. In this table, $\epsilon 1$ has been rounded off to 0.35, and I is an integer.

$k\times\epsilon 1-I=\delta(k)$
1×0.35−0=0.35
2×0.35−1=0.30
3×0.35−1=0.05
4×0.35−1=0.40
5×0.35−2=−0.25
8×0.35−3=−0.20
14×0.35−5=−0.10

These results show that, depending on the sampling interval k, the sign of the numerical fraction $\delta(k)$ can be either negative or positive. When the sign of $\delta(k)$ is positive (for example when k=3) the value of $\delta(k)$ for successive measurements of the fraction, expressed as $\delta(1), \delta(2), \delta(3)$ ... increases such that $\delta(1), \delta(2), \delta(3)$ are 0.05, 0.10, 0.15, respectively. On the other hand, when k=5, the fraction values decrease such that $\delta(1), \delta(2), \delta(3)$ are 0.75, 0.50, 0.25, respectively. This is shown in FIG. 5 by plotting the difference between the true wavelength and the estimated wavelength on the x-axis and the count number M on the y-axis. This behavior of increasing or decreasing fraction values can be seen in FIG. 5 from the slopes of the single-dotted line (k=3) and double-dotted line (k=5). The above example shows that for a loop of k values 1*M, the minimum fraction is 0.05, and that it is obtained when the sampling interval is 3. The minimum fraction is denoted by D and the sampling interval for the minimum fraction is denoted by KD.

In general, the smallest value of the fraction may be regarded to be |D|, therefore, the wavelength measurement error $\Delta$, at the worst, can be taken as 2d|D|/M. In the conventional method, because the fraction $\epsilon M$ is specified as 1, the wavelength measurement error $\Delta$ can be calculated to be less than 76 fm from the relation $\Delta<2d/M$, eqn (4). In the present invention, the minimum fraction zero (at point D in FIG. 5), giving the wavelength measurement error to be $\Delta<4$ fm.

The operation of the computation section 6 (in FIG. 1) will be explained with reference to a flowchart shown in FIGS. 6 which is continued onto FIG. 7. The flowchart refers to an example of the steps for obtaining the nearest estimated wavelength $\lambda MM$ to the target wavelength $\lambda$ of the target light beam 20, and the corresponding measurement error $\Delta$. The maximum count value for the fringe count is denoted by MMAX, and the computation is performed over a loop 1*MMAX to find the minimum fraction D and the required sampling interval kD.

Figure 6:
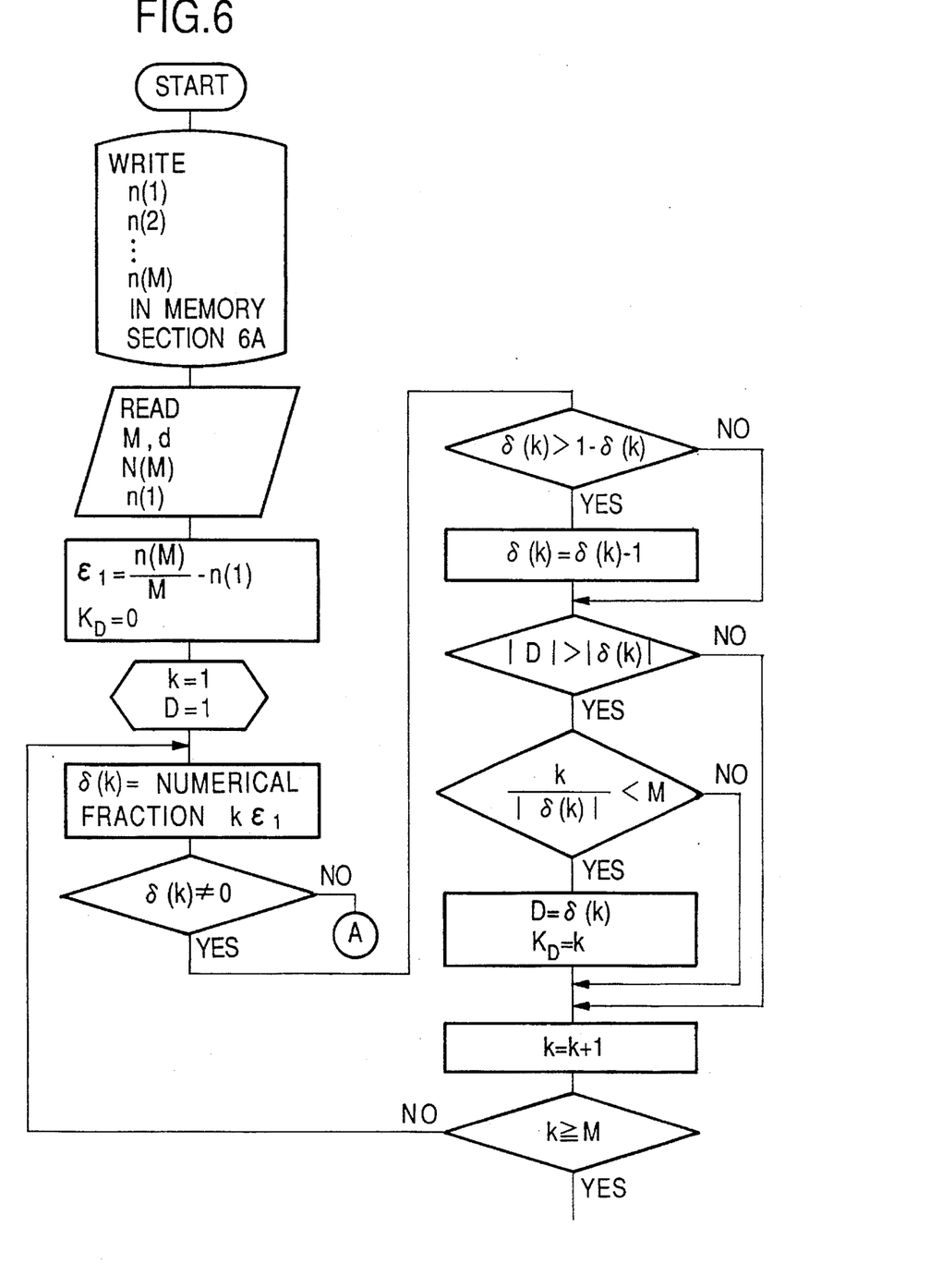
FIG. 6 is a flow chart showing the operation of the measuring apparatus shown in FIG. 1.
Figure 7:
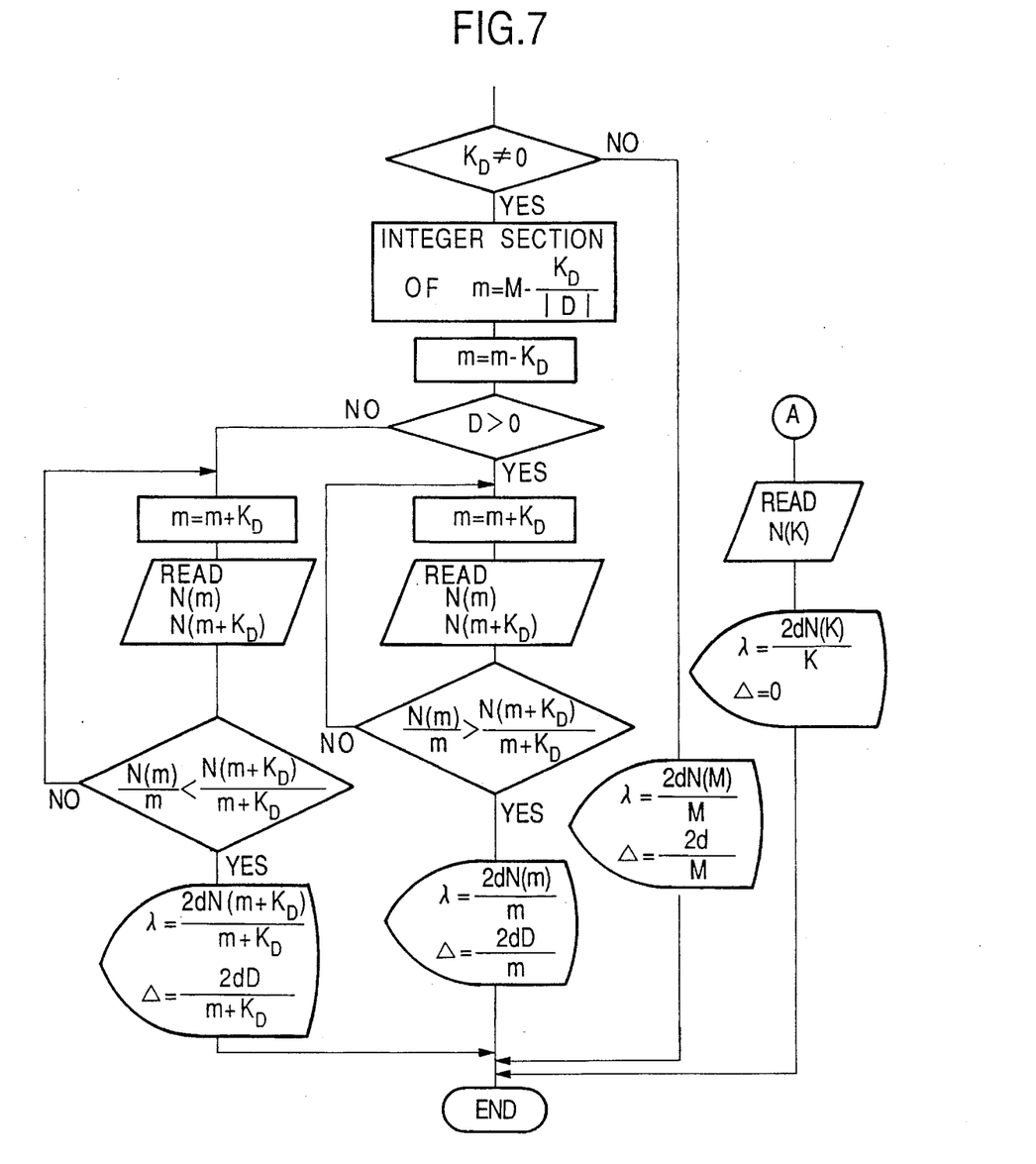
FIG. 7 is a continuation of the flow chart shown in FIG. 1.

FIG. 6 is a flowchart relating to a process of determining a sampling interval kD and a value for $\delta(k)$ by choosing the smallest of the absolute value of $\delta(k)$ for any given value of k by comparing two values, a numerical fraction $(k\epsilon 1)$ and $(k\epsilon 1)-1$. FIG. 7 relates to a process of computing the wavelengths at the sampling interval kD so as to obtain the minimum fraction D, and thereby an wavelength $\lambda MM$ which is nearest to the true wavelength of the target light beam 20.

First, it is necessary to determine the number of fringes to be counted. From eqn (3), it can be seen that when the cumulative number of fringes is low, the precision of wavelength determination is poor. Therefore, to obtain a nearest estimated wavelength $\lambda MM$ to the true wavelength $\lambda$ at a count closest to M, a reverse computation process is used by start from MMAX to obtain the minimum fraction D from the following equation:

$$m = MMAX - KD|\Delta D| \quad (8)$$

As the value of m (which defines the number of fringes for starting the count) is increased at the sampling interval KD up to a maximum value of MMAX, at least one value of $\lambda MM$ will be obtained. Depending on the sign of the minimum fraction D, the magnitude of the computed wavelengths varies in the vicinity of the value of $\lambda MM$ as shown in FIG. 5. When D>0, the adjacent wavelength to $\lambda MM$ shows the largest difference from the target wavelength $\lambda$. The wavelength $\lambda MM$ computed from a relation $\lambda MM=2dN(m)/m$ is assumed to be the target wavelength $\lambda$ and is displayed together with a measurement error $\Delta=2dD/m$. When D<0, the steps are the same, and $\lambda MM$ is obtained from a relation $\lambda MM=2dN(m+KD)/(m+KD)$, and the corresponding measurement error is $\Delta=2dD/(m+KD)$.

In some cases, depending on the relationship of the target wavelength $\lambda$ and the resolution capability d of the moving mirror 3, the number of fringes for which the fraction is minimum may exceed the value of M. In this range of wavelengths, the conventional specification is used to display the results. The fraction changes by $|\delta(k)|$ at the sampling interval k, therefore, the fringes for which the fraction is minimum are produced for every $k/|\delta(k)|$, and the precision is not improved when the count is less than this value. i.e., $M<k/|\delta(k)|$. In FIG. 7, this condition corresponds to KD=0, and the flowchart shows that the results by the conventional computation is displayed. Conversely, when $\delta(k)$ becomes [0], the steps subsequent to (A) (refer to FIG. 6) are taken to display the target wavelength value and zero measurement error.

Figure 2:
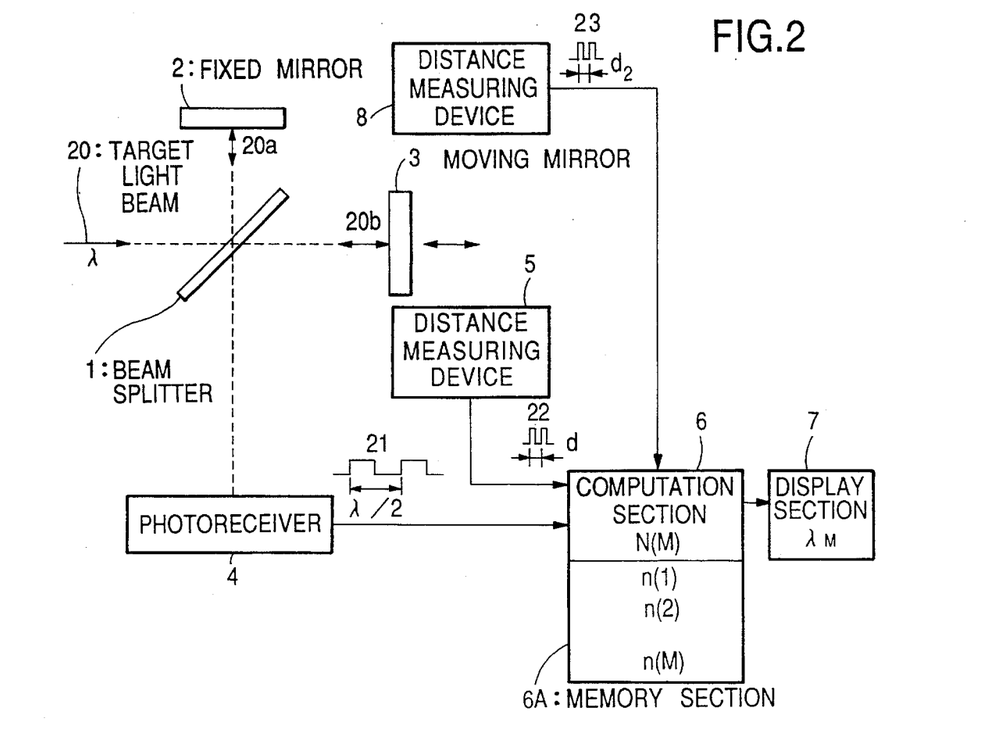
FIG. 2 is a schematic block diagram of a second embodiment of the optical wavelength measuring apparatus of the present invention.

The structural configuration of a second embodiment of the wavemeter of the present invention is shown in FIG. 2. This embodiment is provided with an additional wavemeter 8 to the wavemeter configuration shown in FIG. 1. The additional wavemeter 8 has a different resolution capability d2 by about 0.2% better than the resolution capability d of the wavemeter 5. It is to be noted that so long as two wavemeters of slightly different resolution capabilities are used, either the interference fringe counting method or the opto-electronic method of determining the wavelength may be used.

By providing a difference of 0.2% in the resolution capabilities of the two wavemeters, for example, if d=5.0 nm and d2=5.01 nm, the minimum common multiple of d and d2 is 2505 nm. Therefore, up to about this value of the wavelength, even if one wavemeter reaches a value of M<k/|δ(k)|, the other wavemeter is able to reach a value of M>k/|δ(k)|. In this particular example, the difference is taken as 0.2%, but in actual practice, this difference can be suitably selected depending on the resolution capability and the range of the wavelengths.

Figure 8:
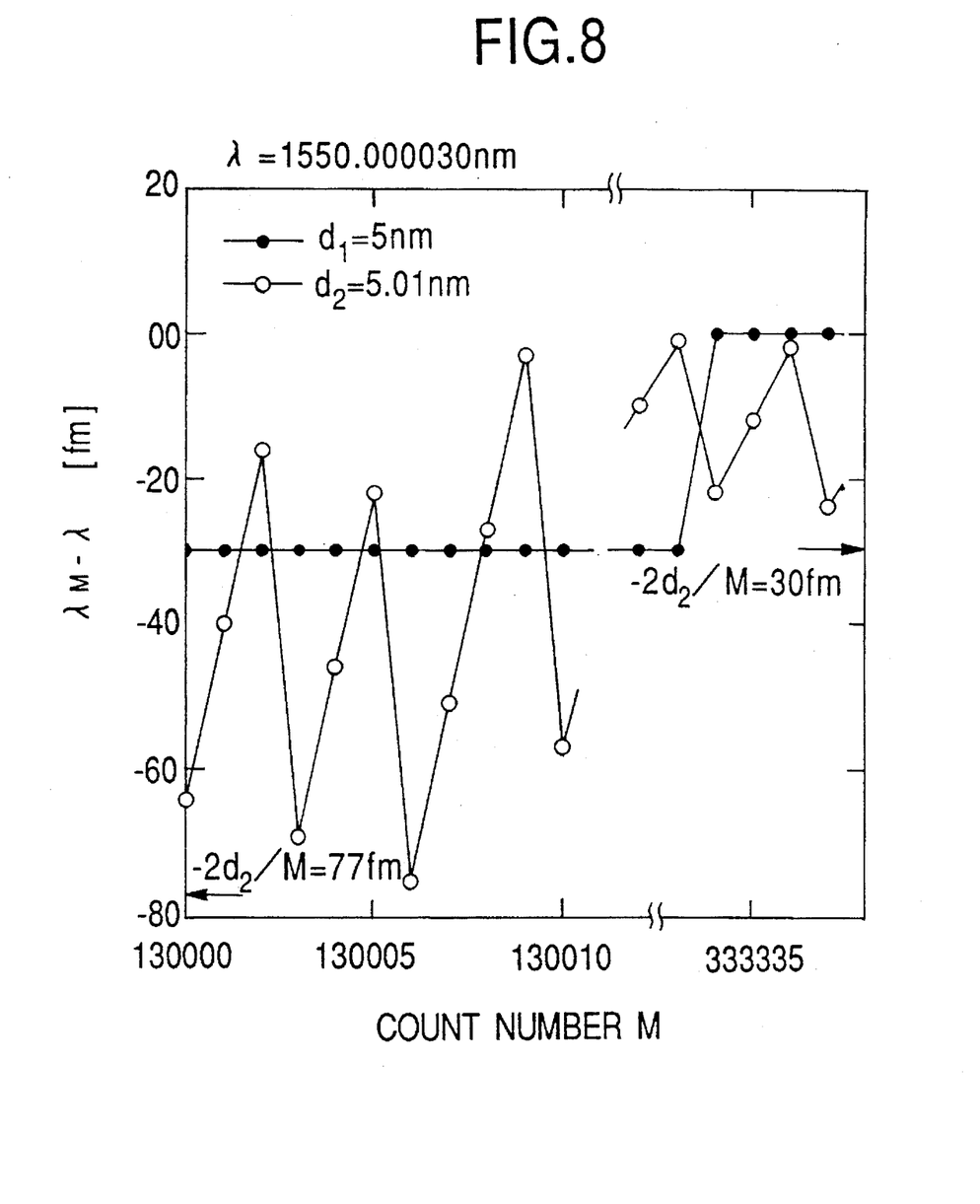
FIG. 8 is a graph showing a relationship of count M to the changes in the wavelengths measured by the apparatus shown in FIG. 2.

The operation of the wavemeter shown in FIG. 2 will be explained with reference to an actual example shown in FIG. 8. The maximum count value is approximately 130,000 (corresponding to the travel distance of about 100 mm), and the target wavelength $\lambda$ is 1550.00003 nm. The resolution capability of the wavemeter in FIG. 2 is 5 nm, and the fractional round off occurs at M=333334, which corresponds to the travel distance of about 260 mm. Because the wavemeter is predisposed to a 100 mm travel distance, a wavemeter of resolution capability d of 5.0 nm can only measure up to a target wavelength of 1550 nm. In contrast, using a wavemeter having a resolution capability d2 of 5.01 nm, it is possible to obtain a count value M=130009 to measure a target wavelength $\lambda$M at 1550.000027 nm.

The above embodiments were illustrated with reference to particular examples of optical/electrical devices, but these example are only illustrative and do not limit the scope of the present invention in any way. Other configurations and devices may be chosen to carry out computation process within the procedure of determining the fractional count as disclosed above.

What is claimed is:

1. A wavemeter apparatus for determining a wavelength $\lambda$ of a target light beam (20) comprising: a beam splitter (1) for dividing said target light beam (20) into a first beam (20a) and a second beam (20b); a fixed mirror (2) for receiving said first beam (20a) to be reflected back to said beam splitter (1); a moving mirror (3) for receiving said second beam (20b) to be reflected back to said beam splitter (1); a photoreceiver (4) for converting an interference fringe, having two $\lambda/2$ spacings, produced by optical interference of said first beam (20a) with said second beam (20b) in accordance with a travel distance of said moving mirror (3), and generating a first pulse signal (21) for every $\lambda/2$ spacing; a first distance measuring device (5) having a first resolution capability d, defining a unit of said travel distance of said moving mirror (3), and generating a second pulse signal (22) for each unit; a computation section (6) for counting first pulse signals (21) produced by said photoreceiver (4) to generate a first cumulative count M, for counting a plurality of said second pulse signals (22) produced by said first distance measuring device (5) to generate a second cumulative count N(M) and for computing a first estimated wavelength $\lambda$M of said target wavelength $\lambda$ as $\lambda$M=2dN(M)/M based on a relation M$\lambda$/2=d(N(M)+εM) where εM is a numerical fraction of said second pulse signals (22) at M; a display section (7) for displaying a result of said first estimated wavelength $\lambda$M; wherein said wavemeter apparatus is provided with further memory section (6A) in said computation section (6) such that:

said memory section (6A) stores a number of counts n(M) of said second pulse signals (22) in a fringe spacing between M and M-1, for all values of M between 1 and a maximum count MMAX;

said computation section (6) computes a value of a first fraction ε1 from a relation, ε1=N(M)/M-n(1) where ε1 is a numerical fraction of said second pulse signals (22) in a first fringe spacing;

determining a sampling interval KD by using said ε1 and an integer coefficient k which minimizes an absolute value of said numerical fraction; determining a starting count m from an integer section of a value given by a relation m=(MMAX-KD)/|D|, where D is a minimum value of said numerical fraction and |D| is an absolute value of D, to compute a second estimated wavelength $\lambda$MM nearest to said wavelength $\lambda$ so that:

when D>0, a maximum wavelength value of $\lambda$MM is computed by a relation $\lambda$MM=2dN(m)/m and a wavelength measurement error $\Delta$ is given by a relation $\Delta$=2dD/m; and when D<0, a maximum wavelength value of $\lambda$MM is computed by a relation $\lambda$MM=2dN(m+kD)/(m+kD) and a wavelength measurement error $\Delta$ is given by a relation $\Delta$=2dD/(m+kD).

2. A wavemeter apparatus as claimed in claim 1, further comprising a second distance measuring device (8) providing a second resolution capability d2, having a different resolution capability than said first resolution capability d, chosen in relation to said wavelength $\lambda$ of said target light beam, for determining said travel distance of said moving mirror (3) and generating said second estimated wavelength.

* * * * *